United States Patent
Weeks

(10) Patent No.: US 6,742,310 B1
(45) Date of Patent: Jun. 1, 2004

(54) TRUSS TIE-DOWN METHOD AND APPARATUS

(75) Inventor: Kevin William Weeks, Glandore (AU)

(73) Assignee: Weeks Peacock Quality Homes Pty. Ltd. (AU)

( * ) Notice: Subject to any disclaimer, the term of this patent is extended or adjusted under 35 U.S.C. 154(b) by 9 days.

(21) Appl. No.: 10/088,623

(22) PCT Filed: Sep. 20, 2000

(86) PCT No.: PCT/AU00/01141
§ 371 (c)(1),
(2), (4) Date: Mar. 19, 2002

(87) PCT Pub. No.: WO01/23684
PCT Pub. Date: May 4, 2000

(30) Foreign Application Priority Data

Sep. 24, 1999 (AU) .............................................. PQ3074

(51) Int. Cl.⁷ .............................. E04C 3/00; E04B 1/00; E04B 7/00
(52) U.S. Cl. .......................... 52/92.2; 52/93.2; 52/639; 52/696; 403/256; 403/345
(58) Field of Search ................ 52/92.1, 92.2, 52/93.1, 93.2, 690, 696, 634, 639, 712; 403/403, 345, 256, 252, 245

(56) References Cited

U.S. PATENT DOCUMENTS

| | | | | |
|---|---|---|---|---|
| 1,192,209 A | * | 7/1916 | Kahn | .......................... 52/696 |
| 1,258,408 A | * | 3/1918 | Hill | .............................. 52/93.2 |
| 1,311,486 A | * | 7/1919 | Benedict | ..................... 52/737.2 |
| 2,234,960 A | * | 3/1941 | Buelow | ....................... 403/233 |
| 3,474,578 A | | 10/1969 | Wippermann | |
| 4,329,826 A | * | 5/1982 | Flogaus et al. | ................ 52/712 |
| 4,342,177 A | * | 8/1982 | Smith | .......................... 52/93.1 |
| 4,586,300 A | * | 5/1986 | Mullin | ........................ 52/93.1 |
| 5,079,884 A | | 1/1992 | Menchetti | |
| 5,152,114 A | * | 10/1992 | Beazley et al. | ................ 52/264 |
| 5,457,927 A | * | 10/1995 | Pellock et al. | ................. 52/633 |
| 5,463,837 A | * | 11/1995 | Dry | ............................... 52/639 |
| 5,600,924 A | * | 2/1997 | Forsberg | ..................... 52/93.2 |
| 5,771,653 A | * | 6/1998 | Dolati et al. | ................ 52/737.6 |
| 6,272,796 B1 | * | 8/2001 | Metzler | ....................... 52/93.1 |

FOREIGN PATENT DOCUMENTS

| | | | | |
|---|---|---|---|---|
| GB | 1006324 | * | 9/1965 | .................. 52/93.2 |
| GB | 2 126 307 A | | 3/1984 | |
| JP | 10-18426 A | | 1/1998 | |
| WO | WO98/49409 | | 11/1998 | |

* cited by examiner

*Primary Examiner*—Brian E. Glessner
(74) *Attorney, Agent, or Firm*—Woodcock Washburn LLP

(57) ABSTRACT

A tie-down connecting element (30) for tying down a truss relative to a wall frame is fixed between the webs (12) of the upper and lower Z-shaped chords (10) and includes a tongue portion (34) which extends downwardly through a slot (50) formed in the lower flange (16) of the lower chord (10) of the truss.

5 Claims, 7 Drawing Sheets

TRUSS TIE-DOWN METHOD AND APPARATUS

TECHNICAL FIELD

This invention relates to a truss tie-down method, and to a truss tie-down apparatus particularly suited for use with a truss in which the upper and lower chords nest and locate one within the other in an inverted relationship at the eave line of the truss.

A truss in which the upper and lower chords nest and locate one within the other in an inverted relationship at the eave line of the truss is known from the present applicant's International Patent Application PCT/AU98/00316 published Nov. 5, 1998 which is hereby incorporated in its entirety by cross-reference.

A full understanding of the present invention requires reference to International Patent Application PCT/AU98/00316.

BACKGROUND ART

It is known from the present applicant's PCT/AU98/00316 to provide a pair of like-sectioned, generally Z-shaped chords each having a vertical web, a horizontal minor flange which terminates in a vertical return, and (an oppositely directed) horizontal major flange which terminates in a vertical return.

From PCT/AU98/00316 it is known to invert one of the two like-sectioned chords so that the chords may nest one within the other at the eave line with the respective webs abutting (and easily fixable together by a bolt or the like) and with each of the minor flanges and returns nested within the major flange and return of the other chord.

The present invention provides a tie-down methodology and apparatus particularly but not exclusively suited for use with the truss system disclosed in International Patent Application PCT/AU98/00316.

DISCLOSURE OF INVENTION

According to one aspect the invention resides in a truss tie-down method for use with a truss in which like-sectioned upper and lower chords nest one within the other in an inverted relationship at the eave line of the truss, and in which each of the chords includes a vertical web, a minor flange extending from one end of the web in a first horizontal direction, and a major flange extending from the other end of the web in a horizontal direction opposite to the first direction and terminating in a vertical return, wherein one chord is inverted relative to the other chord such that the respective vertical webs are closely adjacent and such that each minor flange nests within the major flange and return of the other chord, the method including forming a slot in the major flange of the lower chord; and locating a connecting element between the closely adjacent webs of the chords, the connecting element extending downwardly through the slot formed in the major flange of the lower chord and being adapted to be connected to a wall frame or the like.

According to another aspect the invention resides in a truss including like-sectioned upper and lower chords which nest one within the other in an inverted relationship at the eave line of the truss, and in which each of the chords includes a vertical web, a minor flange extending from one end of the web in a first horizontal direction, and a major flange extending from the other end of the web in a horizontal direction opposite to the first direction and terminating in a vertical return, wherein one chord is inverted relative to the other chord such that the respective vertical webs are closely adjacent and such that each minor flange nests within the major flange and return of the other chord, a slot being formed in the major flange of the lower chord;

a connecting element located between the closely adjacent webs of the upper and lower chords and including a portion extending through the slot, said portion adapted for connection to a wall frame or the like.

According to a further aspect the invention resides in a method of anchoring a truss to a building frame, the method including forming a slot in a chord of the truss;

fastening a connecting element to the truss, the connecting element including a portion extending downwardly through the slot; and fastening the downwardly extending portion of the connecting element to the building frame.

According to another aspect the invention resides in a truss including top and bottom chords meeting at an eave line;

a slot formed in the bottom chord;

a connecting element for fastening the truss to a building frame, the connecting element including a portion extending downwardly through the slot.

According to another aspect the invention resides in a connecting element for fastening a truss to a building frame, the connecting element including a tongue portion adapted to extend through a slot in a chord in a truss;

shoulder portions adapted to seat on the chord adjacent the ends of the slot; and an aperture for receiving a fixing element.

BRIEF DESCRIPTION OF DRAWINGS

Reference will now be made to the accompanying Figures which illustrate preferred embodiments of the invention and in which.

BEST MODE

Figure 1:
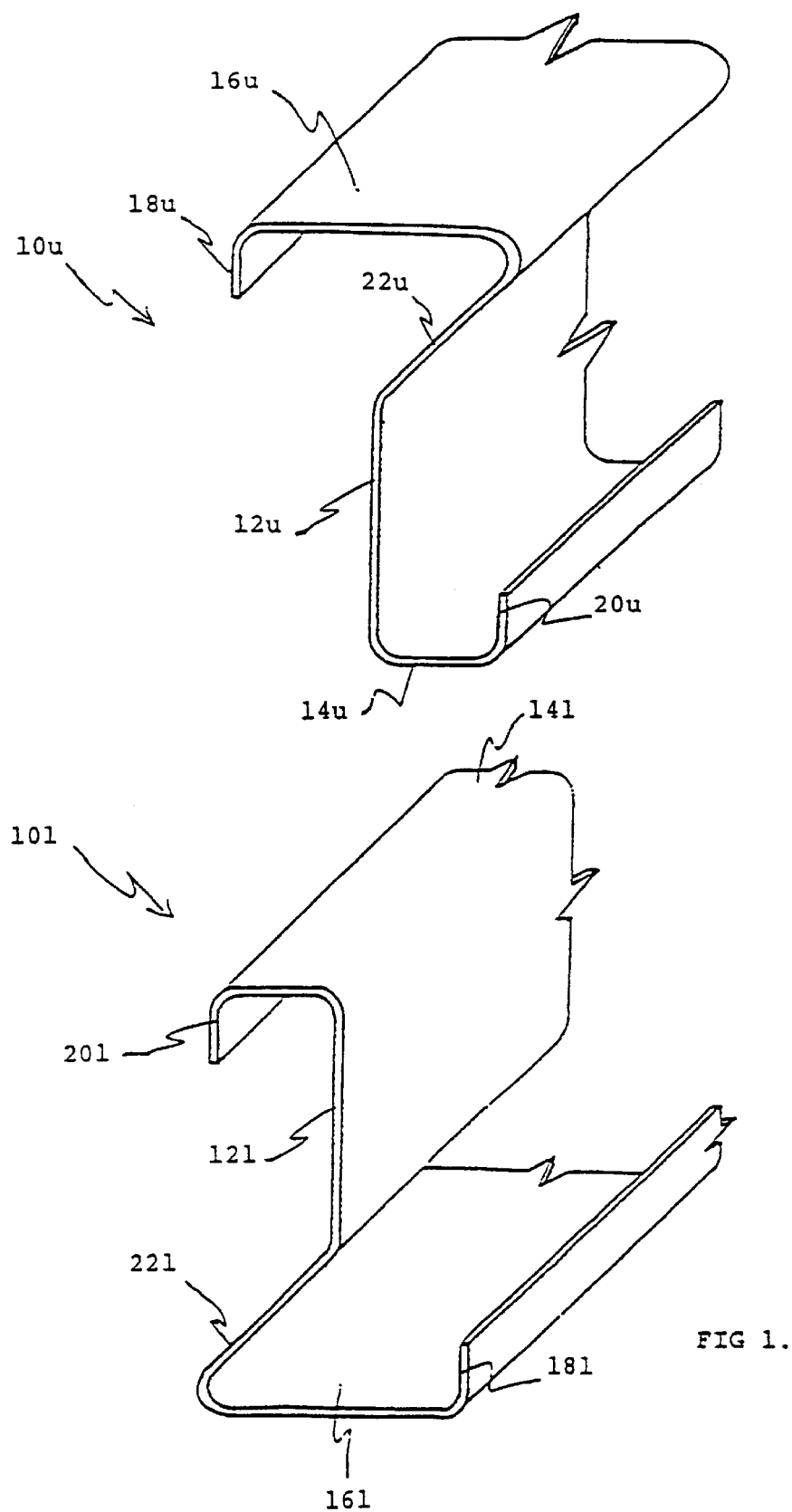
FIG. 1 is a vertically exploded view of a pair of like-sectioned Z-shaped chords adapted to nest one within the other in an inverted relationship at the eave line of a truss.

With reference firstly to FIG. 1 there is shown a pair of like-sectioned substantially Z-shaped chords which are adapted to-nest one within the other in an inverted relationship at the eave line of a truss.

For further description of the shape of the chord per se, the reader is directed to International Patent Application No. PCT/AU98/00316.

As described in PCT/AU98/00316, the lower chord is usually horizontal and the upper chord is inclined at a pitch prescribed by the architect or builder. When nested together, the upper and lower chords are easily interconnected via a fixing element such as a bolt which passes through the webs of the respective chords.

Referring to FIG. 1, the reference numerals include either a "u" or "l", designating "upper" and "lower" respectively.

Each chord 10 comprises a web 12, minor flange 14 which terminates in a return 20, and major flange 16 which terminates in a return 18. The vertical web 12 is connected to the horizontal major flange 16 via an inclined or divergent web portion 22.

Figure 2:
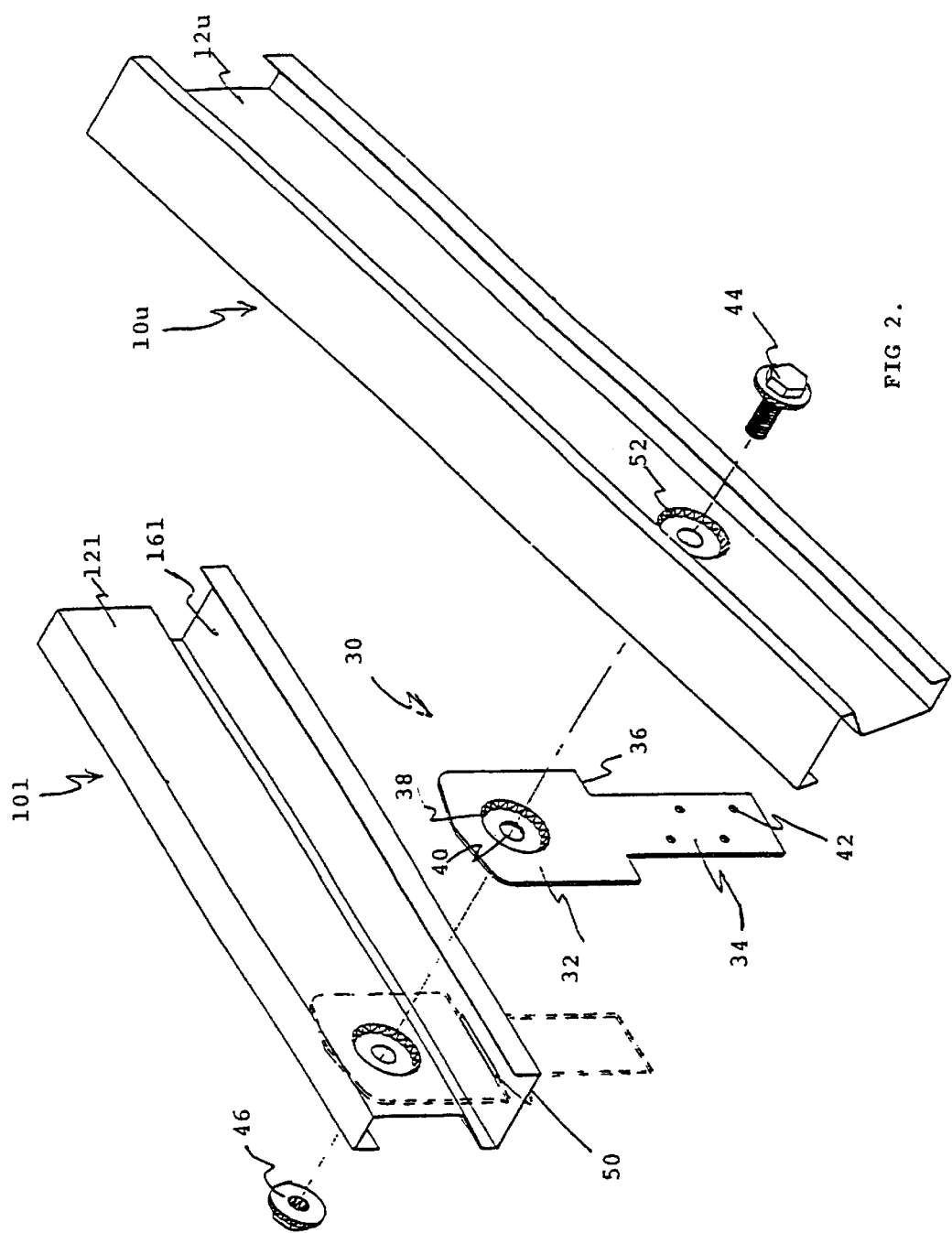
FIG. 2 is horizontally exploded view of the upper and lower chord with a connecting element sandwiched therebetween via a bolt and nut arrangement.

Referring now to FIG. 2, a connecting element 30 is in use sandwiched between the web 12u of upper chord 10u and the web 12l of lower chord 10l.

The connecting element 30 includes an upper head portion 32 in which is defined a pressed region 38 through which an aperture 40 is formed. Connecting element 30 also includes a downwardly extending tongue portion 34 which includes apertures 42 which in use receive screws for fixing the connecting element 30 to a wall frame or the like (not illustrated in FIG. 2).

The connecting element 30 also includes a pair of shoulders 36 which effectively define the boundary between upper head portion 32 and lower tongue portion 34 of the connecting element 30.

As shown in ghosted line in FIG. 2, the connecting element 30 is in use located such that the tongue portion 34 extends downwardly through a slot 50 formed in the major flange 16l of the lower chord 10l. As shown, the shoulders 36 of the connecting element 30 seat on the major flange 16l of the lower chord 10l adjacent the ends of the slot 50.

As shown, the web 12u of the upper chord and the web 12l of the lower chord are both pressed and punched so as to be complementary in shape to assist in locating of the chords and connecting element relative to each other and also to improve shear strength between the chords and connecting element.

As shown, bolt 44 seats in a pressed region 52 formed. in the web 12u of the upper chord. The bolt 44 extends in use through the web 12u of the upper chord, then through the head portion 32 of the connecting element 30 and then through the web 12l of the lower chord. Nut 46 is provided to co-operate with bolt 44.

As will be readily apparent, a protruding or bossed region is defined on the opposite side of web 12u from pressed region 52. This bossed region is received in pressed region 38 of the connecting element. Similarly, the bossed region formed on the opposite side of the connecting element 30 is received in the pressed region formed in lower web 12l.

A significant benefit of the present invention is the fact that the connecting element 30 is located centrally of the upper and lower chords. Accordingly, tongue portion 34 of the connecting element 30 extends downwardly from a position which is central of the truss thereby transferring loads directly without any twisting or bending loads. This provides significant structural benefits.

Figure 3:
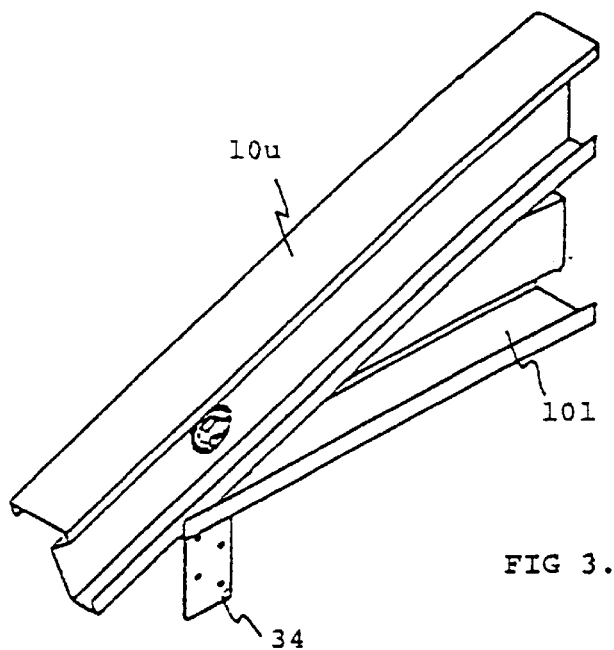
FIG. 3 is an assembled view of FIG. 2.
Figure 4:
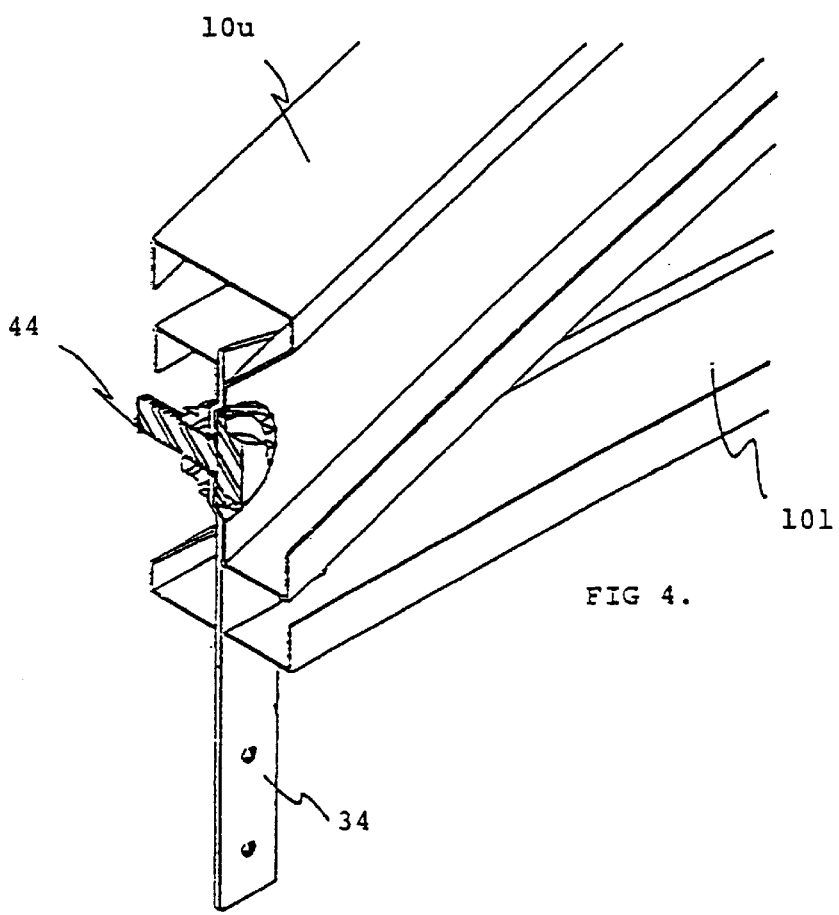
FIG. 4 is a sectioned view of FIG. 3.

Referring now to FIGS. 3 and 4, there is shown the assembled truss with connecting element including the tongue portion 34 of the connecting element extending downwardly from the truss.

Figures 5, 6:
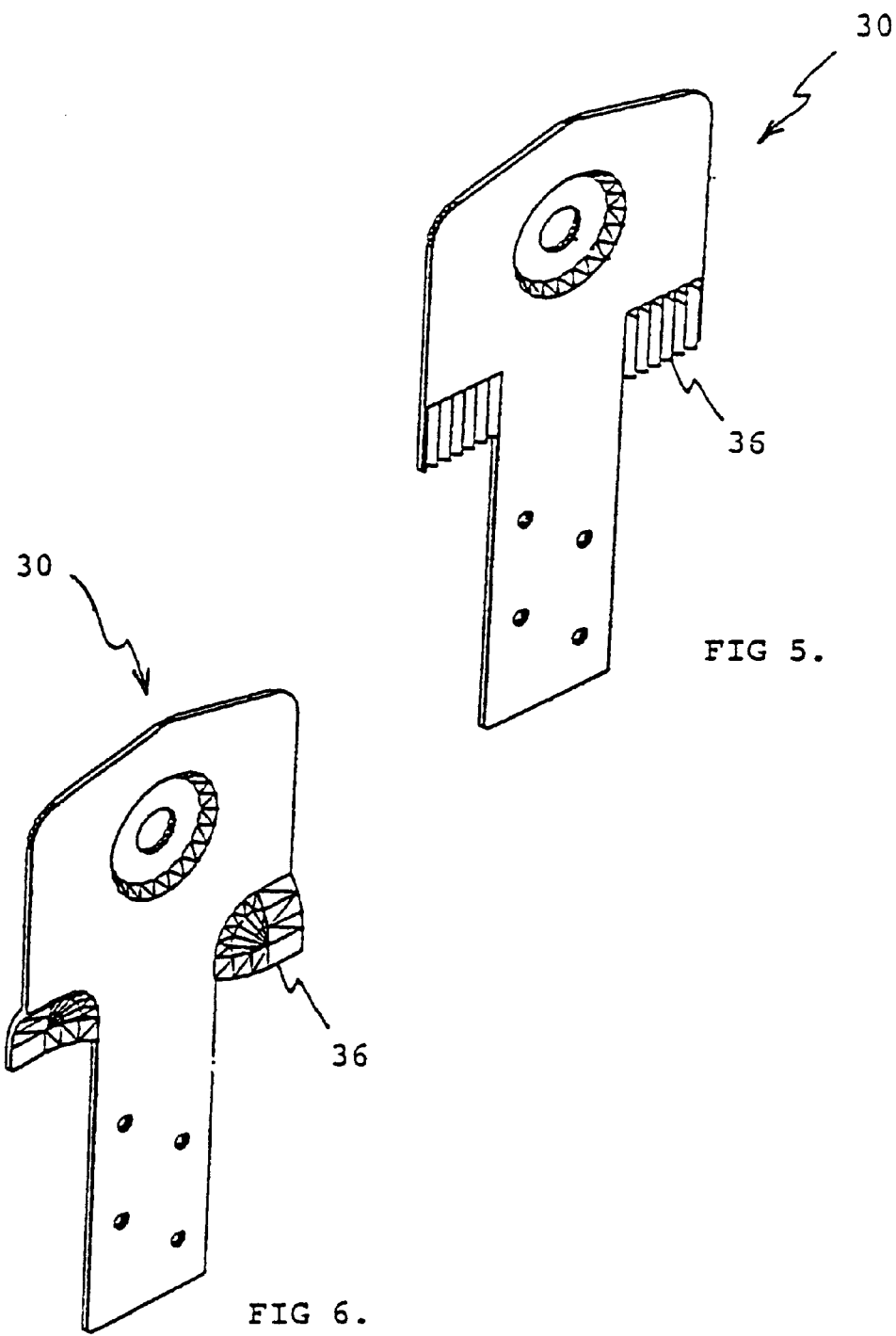
FIG. 5 is a perspective view of an alternative connecting element for the embodiment illustrated in FIGS. 2 to 4.
FIG. 6 is a perspective view of-another alternative connecting element for the embodiment illustrated in FIGS. 2 to 4.

Referring now to FIGS. 5 and 6 there are illustrated alternative embodiments of connecting element 30. In FIG. 5, the shoulder regions 36 have been corrugated to improve strength and to provide a greater bearing or contact surface between the shoulders of the connecting element and the major flange 16l of the lower chord. Similarly, in FIG. 6, the shoulders have been pressed in oppositely directed scalloped shapes.

Figure 7:
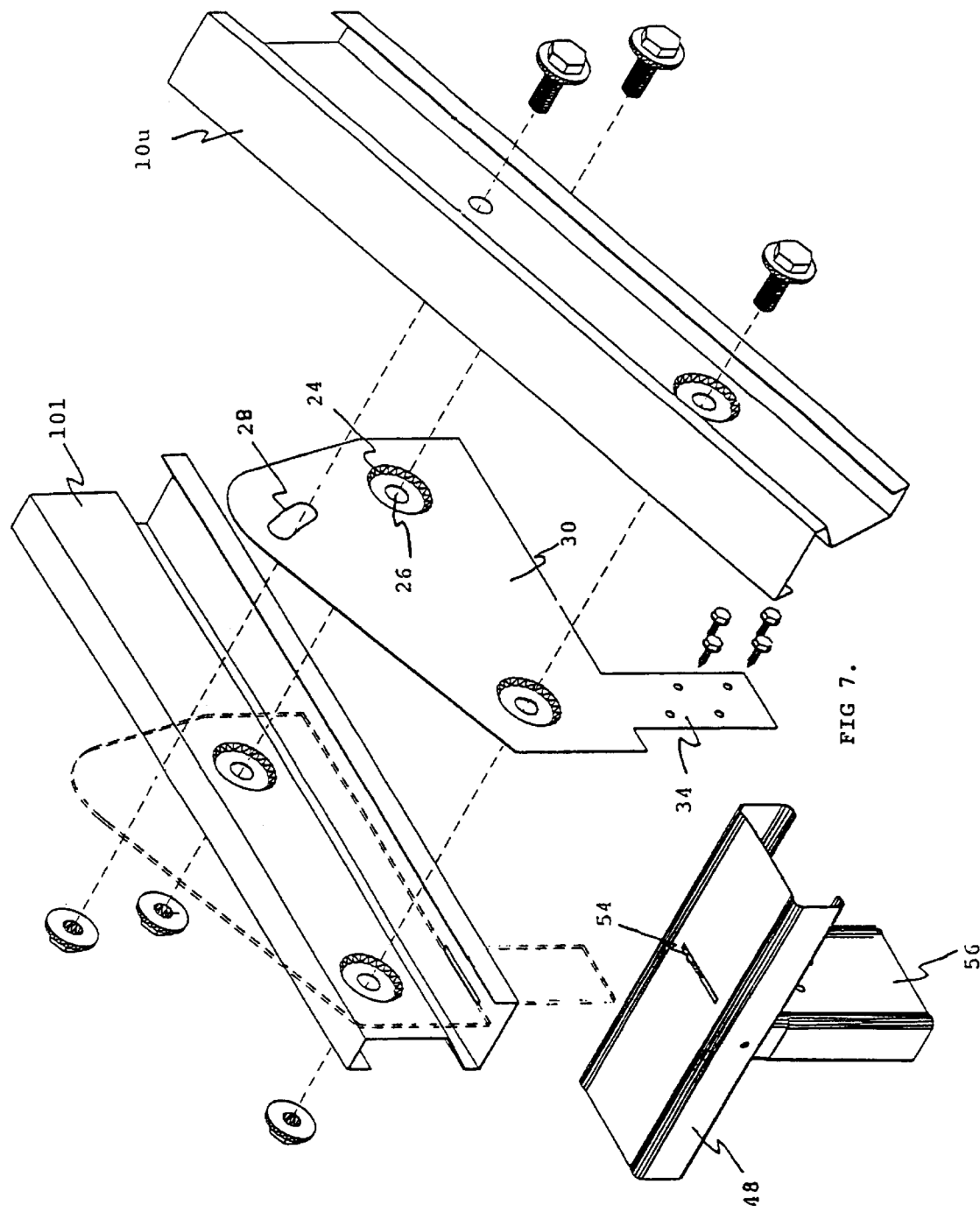
FIG. 7 is a horizontally exploded view of a second embodiment of the invention in which the connecting element is adapted for connection to the upper chord at two points and to the lower chord at two points.

Referring to FIG. 7, there is illustrated a second embodiment of the invention in which the connecting element 30 is bolted to the lower chord at two locations, and to the upper chord at two locations. For this purpose, the connecting element 30 includes an additional, pair of apertures 26 and 28. Aperture 26 is formed in a pressed region 24 which aligns with a similar pressed region and aperture formed in the lower chord. In contrast, aperture 28 is slot-shaped and is adapted to cooperate with an aperture formed in the upper chord which is not surrounded by a pressed region.

As will be readily appreciated, the slotted nature of aperture 28 allows the pitch of the upper chord, and hence roof, to be varied within a limited range.

Figure 8:
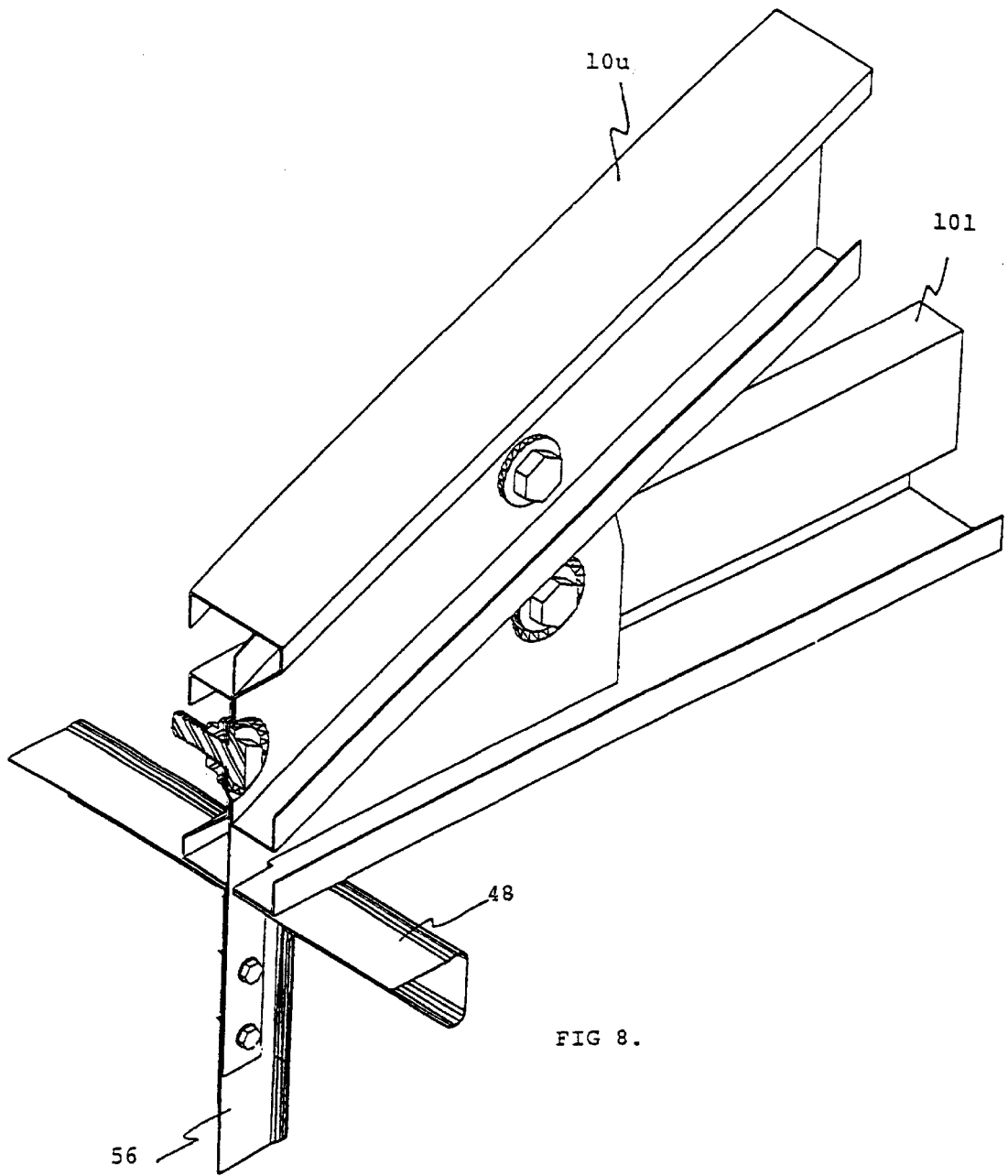
FIG. 8 is an assembled and sectioned view of FIG. 7.

Referring to FIGS. 7 and 8, it will be noted that the wall frame has been illustrated in the form of a vertical stud 56 and a horizontal top plate 48. Top plate 48 is suitably slotted at 54 to receive the downwardly extending tongue portion 34 of connecting element 30 so that the tongue portion 34 can be readily fixed to the stud via the illustrated screws. Again, it is emphasised that the central location of the connecting element relative to the truss allows loads to be directly applied to the stud without twisting or rotation.

Figure 9:
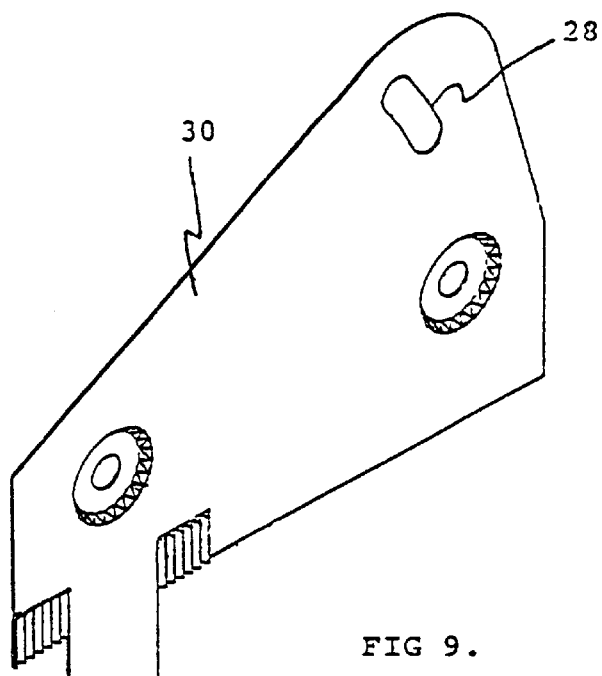
FIG. 9. is a perspective view of an alternative connecting element for the embodiment illustrated in FIGS. 7 and 8.
Figure 10:
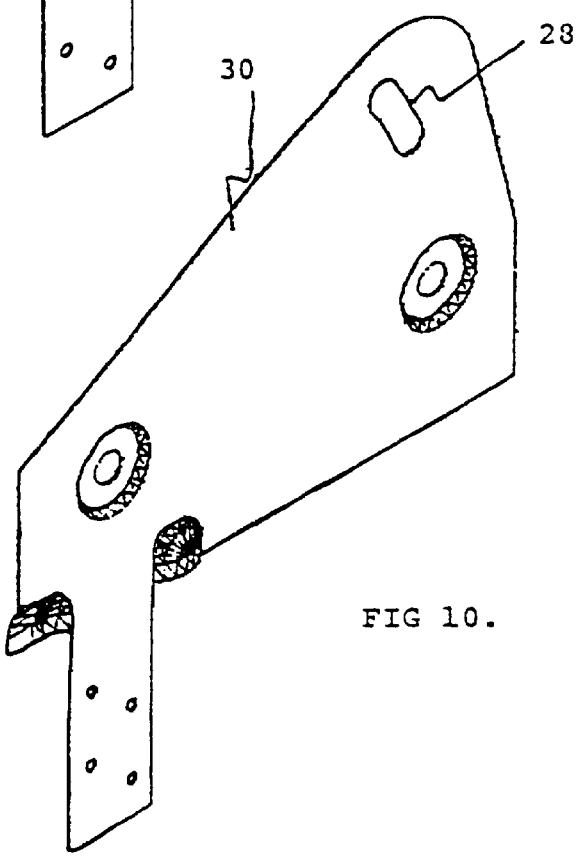
FIG. 10 is a perspective view of another connecting-element for the embodiment illustrated in FIGS. 7 and 8.

Finally, referring to FIGS. 9 and 10, there are illustrated alternative connecting elements akin to FIGS. 5 and 6. Specifically, FIG. 9 illustrates an arrangement in which the shoulders of the connecting element are corrugated and FIG. 10 illustrates an embodiment in which the shoulders are scalloped in opposite directions.

It will, of course, be realised that the above has been given by way of illustrative example(s) of the invention. Any variations, modifications, or omissions, as would be apparent to persons skilled in the art, are deemed to fall within the broad scope of this invention.

What is claimed is:

1. A truss tie-down method for use with a truss in which like-sectioned upper and lower chords nest one within the other in an inverted relationship at the eave line of the truss, and in which each of the chords includes a vertical web, a minor flange extending from one end of the web in a first horizontal direction, and a major flange extending from the other end of the web in a horizontal direction opposite to the first direction and terminating in a vertical return, wherein one chord is inverted relative to the other chord such that the respective vertical webs are closely adjacent and such that each minor flange nests within the major flange and return of the other chord, the method including:

forming a slot in the major flange of the lower chord; and locating a connecting element between the closely adjacent webs of the chords, the connecting element extending downwardly through the slot formed in the major flange of the lower chord and being adapted to be connected to a wall frame.

2. A truss including:

like-sectioned upper and lower chords which nest one within the other in an inverted relationship at the eave line of the truss, and in which each of the chords includes a vertical web, a minor flange extending from one end of the web in a first horizontal direction, and a major flange extending from the other end of the web in a horizontal direction opposite to the first direction and terminating in a vertical return, wherein one chord is inverted relative to the other chord such that the respective vertical webs are closely adjacent and such that each minor flange nests within the major flange and return of the other chord, a slot being formed in the major flange of the lower chord;

a connecting element located between the closely adjacent webs of the upper and lower chords and including a portion extending through the slot, said portion adapted for connection to a wall frame.

3. A truss as claimed in claim 2, wherein the connecting element includes shoulders adapted to seat on the major flange of the lower chord adjacent the ends of the slot.

4. A truss as claimed in claim 2, wherein the connecting element is positively located by a fixing element which extends through the webs and connecting element.

5. A truss as claimed in claim 4, wherein the fixing element extends through complementary bosses formed in the webs and connecting element.

* * * * *